United States Patent
Koch et al.

(10) Patent No.: US 11,560,056 B2
(45) Date of Patent: Jan. 24, 2023

(54) BALLAST WEIGHT MANAGEMENT SYSTEM FOR A WORK VEHICLE

(71) Applicant: CNH Industrial America LLC, New Holland, PA (US)

(72) Inventors: Lucas Koch, St. Louis Park, MN (US); Rajeshwar Adupala, Naperville, IL (US); Rowland J. Milburn, Jr., Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 598 days.

(21) Appl. No.: 16/678,445

(22) Filed: Nov. 8, 2019

(65) Prior Publication Data

US 2020/0151592 A1     May 14, 2020

Related U.S. Application Data

(60) Provisional application No. 62/758,540, filed on Nov. 10, 2018.

(51) Int. Cl.
| | |
|---|---|
| *B60K 35/00* | (2006.01) |
| *G06N 5/04* | (2006.01) |
| *B62D 49/08* | (2006.01) |
| *G07C 5/08* | (2006.01) |

(52) U.S. Cl.
CPC .......... *B60K 35/00* (2013.01); *B60K 2370/16* (2019.05); *B62D 49/085* (2013.01); *G06N 5/04* (2013.01); *G07C 5/085* (2013.01)

(58) Field of Classification Search
CPC .. B60K 35/00; B60K 2370/16; B62D 49/085; G06N 5/04; G07C 5/085
See application file for complete search history.

(56) References Cited

U.S. PATENT DOCUMENTS

| | | | | |
|---|---|---|---|---|
| 2017/0242447 | A1* | 8/2017 | Vik | B60K 1/00 |
| 2019/0219489 | A1* | 7/2019 | Ki | G01N 3/42 |

OTHER PUBLICATIONS

Sandor Rethy, "Microsoft Excel—Loan Calculator Templates" Sep. 11, 2015, YouTube (Year: 2015).*

* cited by examiner

*Primary Examiner* — Michael D Lang
(74) *Attorney, Agent, or Firm* — Rickard Demille; Rebecca Henkel

(57) ABSTRACT

A work vehicle includes: a chassis; a first axle carried by the chassis; a pair of first wheels rotatably coupled to the first axle; a first weight sensor associated with the first axle and configured to output a first weight signal; a second axle carried by the chassis; a pair of second wheels rotatably coupled to the second axle; a second weight sensor associated with the second axle and configured to output a second weight signal; and a controller operatively coupled to the first and second weight sensors. The controller is configured to: receive the first and second weight signals; determine a weight distribution of the work vehicle based on the received first and second weight signals; analyze the determined weight distribution to determine at least one recommended operating parameter; and output a recommendation signal based on the at least one recommended operating parameter.

16 Claims, 4 Drawing Sheets

BALLAST WEIGHT MANAGEMENT SYSTEM FOR A WORK VEHICLE

CROSS REFERENCE TO RELATED APPLICATIONS

This application claims the benefit of U.S. Provisional Patent Application No. 62/758,540, entitled "BALLAST WEIGHT MANAGEMENT SYSTEM FOR A WORK VEHICLE" and filed Nov. 10, 2018, the contents of which are incorporated herein by reference.

BACKGROUND OF THE INVENTION

The present invention relates to work vehicles, and, more particularly, to work vehicles that make use of ballasts for weight distribution.

Work vehicles, such as agricultural tractors, are often used to pull various agricultural implements that are necessary for tilling, seedbed preparation, planting, mowing, raking, harvesting, baling, spraying, and fertilizing. Such work vehicles include an engine that rotates an axle (generally a rear axle) via a transmission to provide tractive force for the vehicle. Some work vehicles include a pair of wheels rotatably coupled to the axle, with each wheel including a tire that is filled with pressurized fluid, such as compressed air. The work vehicle may also include an additional axle, such as a front axle, with a pair of wheels rotatably coupled to the axle, although the front axle may not be driven by the engine.

The wheels of the work vehicle provide traction for the work vehicle to move by frictionally engaging the ground. As is known, the traction of the work vehicle is generally controlled by the weight distribution of the work vehicle. If the wheels do not properly engage the ground, the work vehicle will not have the proper traction to travel and accomplish a desired mission.

What is needed in the art is a work vehicle that can assist an operator in managing the traction of the wheels.

SUMMARY OF THE INVENTION

Exemplary embodiments formed in accordance with the present disclosure provide work vehicles with weight sensors associated with axles of the vehicle and a controller that outputs a recommendation signal to provide recommended operating parameters based on a weight distribution of the work vehicle.

In some exemplary embodiments provided in accordance with the present disclosure, a work vehicle includes: a chassis; a first axle carried by the chassis; a pair of first wheels rotatably coupled to the first axle; a first weight sensor associated with the first axle and configured to output a first weight signal; a second axle carried by the chassis; a pair of second wheels rotatably coupled to the second axle; a second weight sensor associated with the second axle and configured to output a second weight signal; and a controller operatively coupled to the first weight sensor and the second weight sensor. The controller is configured to: receive the first weight signal and the second weight signal; determine a weight distribution of the work vehicle based on the received first weight signal and the received second weight signal; analyze the determined weight distribution to determine at least one recommended operating parameter; and output a recommendation signal based on the at least one recommended operating parameter.

In some exemplary embodiments, a method for providing operating parameters for a work vehicle is provided. The method is performed by a controller and includes: receiving a first weight signal from a first weight sensor associated with a first axle rotatably coupled with a first pair of wheels of the work vehicle; receiving a second weight signal from a second weight sensor associated with a second axle rotatably coupled with a second pair of wheels of the work vehicle; determining a weight distribution of the work vehicle based on the received first weight signal and the received second weight signal; analyzing the determined weight distribution to determine at least one recommended operating parameter; and outputting a recommendation signal based on the at least one recommended operating parameter.

A possible advantage of exemplary embodiments provided in accordance with the present disclosure is that the output recommendation signal can alert an operator to an optimal operating weight, weight distribution, and tire pressure for operating the work vehicle to complete a specific mission.

Another possible advantage of exemplary embodiments provided in accordance with the present disclosure is that the work vehicle can include a display with a graphical user interface that guides the operator through inputting additional parameters to determine the recommended operating parameters.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
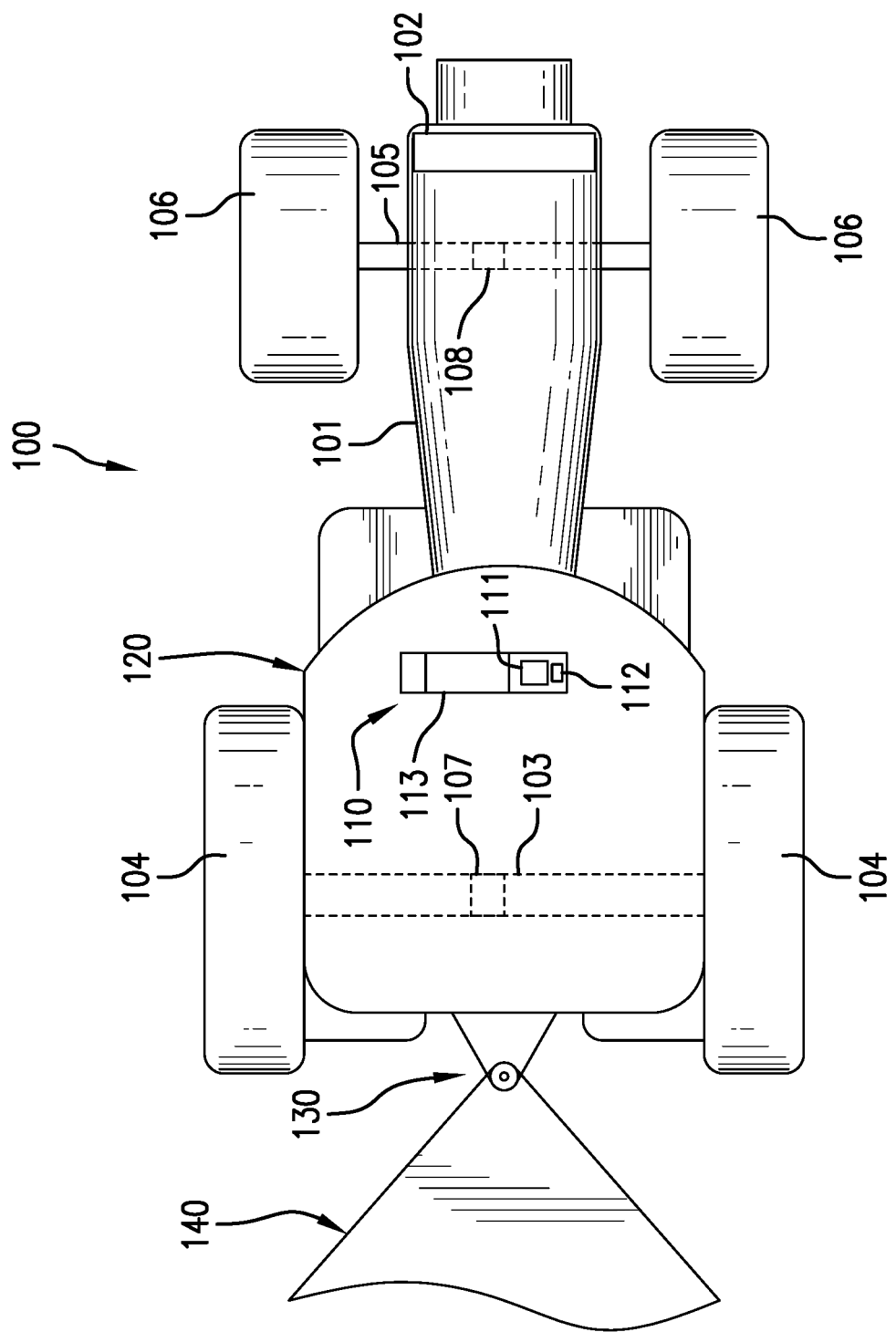
FIG. 1 is a top view of an exemplary embodiment of a work vehicle, illustrated in the form of a tractor, towing an implement and formed in accordance with the present disclosure.

Referring now to the drawings, and more particularly to FIG. 1, an exemplary embodiment of a work vehicle, illustrated in the form of a tractor 100, formed according to the present disclosure is illustrated. The tractor 100 includes a chassis 101 carrying a prime mover, such as an internal combustion engine 102, that rotatably couples to a first axle 103 to rotate a first pair of wheels 104. As illustrated, the first axle 103 is a rear axle. The chassis 101 also carries a second axle 105, illustrated as a front axle, with a second pair of wheels 106 rotatably coupled to the front axle 105. As used herein, the term "wheel" may refer to a tire or an entire wheel construction including a tire, as is known. In some embodiments, the front axle 105 is rotatably coupled to the engine 102 alternatively, or in addition, to the rear axle 103. The tractor 100 may also include an operator cab 120 where an operator may sit during operation of the tractor 100. The tractor 100 may further include a hitch 130 that couples to an implement 140 so the tractor 100 may tow the implement 140.

A first weight sensor 107 is associated with the rear axle 103 and configured to output a first weight signal. As used herein, the "first weight signal" is a signal that corresponds to a weight placed on the rear axle 103, which may or may not be evenly distributed to the coupled wheels 104. In some embodiments, the first weight sensor 107 is a load sensor that measures the load on the rear axle 103 to determine the amount of weight placed on the rear axle 103. The output first weight signal may directly correspond to the sensed load, e.g., a greater sensed load may result in a higher frequency and/or amplitude of the output first weight signal, and vice versa. Many different types of suitable weight sensors that may be used as the first weight sensor 107 are known, so further description is omitted for brevity.

Similarly, a second weight sensor 108 is associated with the front axle 105 and configured to output a second weight signal. As used herein, the "second weight signal" is a signal that corresponds to a weight placed on the front axle 105, which may or may not be evenly distributed to the coupled wheels 106. In some embodiments, the first weight sensor 108 is a load sensor that measures the load on the front axle 105 to determine the amount of weight placed on the front axle 105. The output second weight signal may directly correspond to the sensed load, e.g., a greater sensed load may result in a higher frequency and/or amplitude of the output second weight signal, and vice versa. Many different types of suitable weight sensors that may be used as the second weight sensor 108 are known, so further description is omitted for brevity.

A controller 111, such as an electrical processing circuit, is operatively coupled to the first weight sensor 107 and the second weight sensor 108 to receive the output first weight signal and the output second weight signal, respectively. As used herein, "operatively coupled" signifies that the two "operatively coupled" elements are in electronic communication so electronic signals may be exchanged between the two operatively coupled elements. The operative coupling may be, for example, a wired or wireless connection, which may be direct or indirect through an intermediary, such as a signal convertor. In some embodiments, the controller 111 is part of a control system 110 that is placed in the operator cab 120 and allows an operator to control various functions of the work vehicle 100. The control system 110 may further include a memory 112 and a display 113 operatively coupled to the controller 111. In some embodiments, the display 113 is also configured as an input device, such as a touchscreen device, that also allows operator input to be received by the controller 111 via the input device. The controller 111 may receive, for example, additional parameter signals from the touchscreen device 113, as will be described further herein. In alternative embodiments, the control system 110 includes a separate input device, such as a keyboard, operatively coupled to the controller 111 to provide additional parameter signals to the controller 111.

The controller 111 determines a weight distribution of the work vehicle 100 based on the received first and second weight signals. For example, the controller 111 may be configured to separately determine a first weight amount exerted on the rear axle 103, such as 42,500 pounds, and a second weight amount exerted on the front axle 105, such as 10,000 pounds, and determine the weight distribution of the work vehicle 100 based on these weights and known geometry of the work vehicle 100. Once the weight distribution of the work vehicle 100 is determined, the controller 111 may analyze the determined weight distribution to determine at least one recommended operating parameter, such as a recommended weight amount and a recommended weight placement of the recommended weight amount. The controller 111 may determine the recommended operating parameter by, for example, comparing the determined weight distribution to a recommended weight distribution stored on the memory 112. Upon comparing the determined weight distribution to the recommended weight distribution, the controller 111 can determine the difference between the determined and recommended weight distributions and output a recommendation signal to, for example, the display 113 to present the at least one recommended operating parameter. For example, the controller 111 may determine that the total weight is less than a recommended minimum weight, and output a recommendation signal conveying that additional weight should be added to the work vehicle 100, such as by coupling ballast weights to the work vehicle 100.

In some embodiments, the memory 112 stores a table with a plurality of recommended weight distributions. The recommended weight distributions may be determined based on one or more additional parameter signals received by the controller 111, other than weight amounts exerted on the axles 103, 105. Other operating parameters conveyed to the controller 111 by the additional parameter signal(s) may include, for example, a current mission of the work vehicle 100, i.e., the intended function of the work vehicle 100 during operation, a tire size of the wheels 104, 106, a tire pressure at each of the wheels 104, 106, etc., as will be described further herein.

Figure 2:
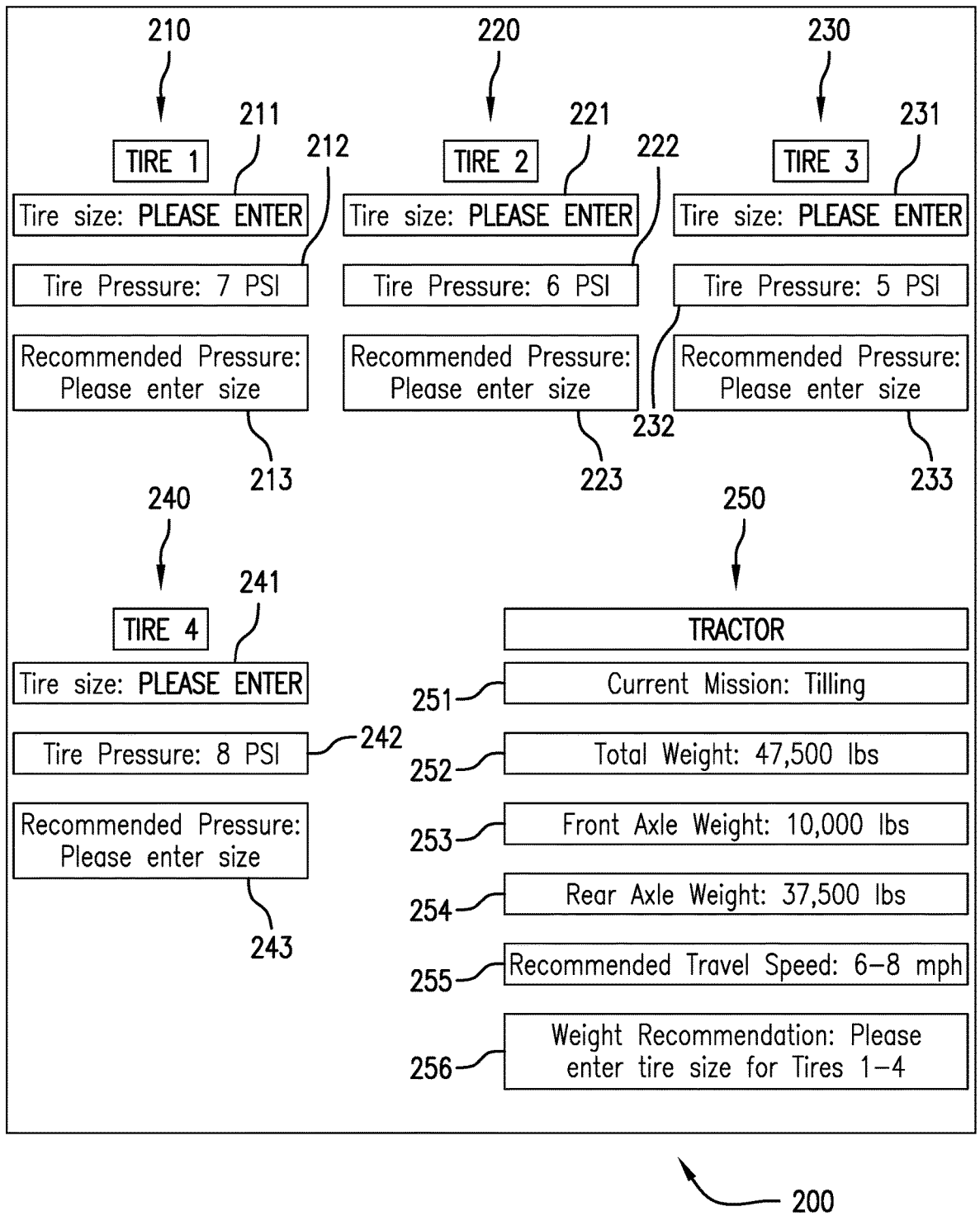
FIG. 2 is an illustration of an exemplary embodiment of a graphical user interface that may be presented by a display of the work vehicle illustrated in FIG. 1.

Referring now to FIG. 2, an exemplary embodiment of a graphical user interface (GUI) 200 that may be presented on the display 113 is illustrated. The code for the GUI 200 may be at least partially stored on the memory 112 that is operatively coupled to the controller 111. As illustrated, the GUI 200 has five distinct information areas 210, 220, 230, 240, 250 presenting information about the work vehicle 100. The information area 210 presents information about one of the wheels, such as one of the rear wheels 104; the information area 220 presents information about the other rear wheel 104; the information area 230 presents information about one of the front wheels 106; and the information area 240 presents information about the other front wheel 106. Collectively, the information areas 210, 220, 230, and 240 may be referred to as the "tire information areas." The information area 250, on the other hand, presents information about the tractor 100.

As illustrated, each of the tire information areas 210, 220, 230, 240 may present a respective tire size graphic 211, 221, 231, 241 that presents a size of each respective wheel 104, 106. Each of the tire information areas 210, 220, 230, 240 may also present a respective tire pressure graphic 212, 222, 232, 242 and a recommended tire pressure graphic 213, 223, 233, 243. The tire pressure displayed in the tire pressure graphics 212, 222, 232, 242 may be determined using a tire pressure monitoring system (TPMS) of the work vehicle 100 that is operatively coupled to the controller 111, as is known. The recommended tire pressure graphics 213, 223, 233, 243, on the other hand, may be updated based on the recommendation signal output by the controller 111, as will be further described herein.

In some embodiments, the controller 111 outputs a parameter query signal to the display 113 so the GUI 200 is updated to present one or more additional parameter input graphics. In the illustrated embodiment, the output parameter query signal from the controller 111 updates the display 113 to present the tire size graphics 211, 221, 231, 241 as "PLEASE ENTER," indicating that the tire size of one or more of the wheels 104, 106 is unknown. An operator may then enter the tire sizes into the tire size graphics 211, 221, 231, 241 so the controller 111 receives additional parameter signals corresponding to the sizes of the tires 104, 106. In some embodiments, an operator may select the respective tire size for each of the wheels 104, 106 from a drop-down menu or box that is presented when the operator selects a respective tire size graphic 211, 221, 231, 241. Alternatively, the operator may enter the tire size into the tire size graphics 211, 221, 231, 241 using, for example, a keyboard. As the operator enters the tire sizes into the tire size graphics 211, 221, 231, 241, the controller 111 may receive additional parameter signals that correspond to the tire sizes of the tires 104, 106.

As illustrated in FIG. 2, each of the recommended tire pressure graphics 213, 223, 233, 243 presents "Please enter size," which indicates that the controller 111 has not determined the recommended tire pressures for the wheels 104, 106. In some embodiments, the controller 111 determines the recommended tire pressure for each wheel based on the weight distribution of the work vehicle 100, the current mission of the work vehicle 100, and the size of the tires at each wheel 104, 106. When the tire sizes for the wheels 104, 106 are unknown, as illustrated in FIG. 2, the controller 111 may output a parameter query signal to the display 113 to update the GUI 200 so the recommended tire pressure graphics 213, 223, 233, 243 present that the tire sizes must be entered before a recommended tire pressure for each wheel 104, 106 may be determined and presented. Thus, the recommended tire pressure graphics 213, 223, 233, 243 can direct an operator to input additional parameters so additional parameter signals can be sent to the controller 111. The controller 111 can then determine the recommended tire pressures for the wheels 104, 106 based on the received additional parameter signal and output a recommendation signal to the display 113. The output recommendation signal can cause the display 113 to update the recommended tire pressure graphics 213, 223, 233, 243 of the GUI 200, as will be described further herein.

The information area 250 may present several graphics to the operator that convey various operating parameters of the work vehicle 100. In the illustrated embodiment, the information area 250 presents graphics 251, 252, 253, 254, 255, and 256.

The graphic 251 may be a current mission graphic 251 that presents a current mission, i.e., an intended function, of the work vehicle 100. The current mission graphic 251 may be selected by an operator to present, for example, a drop-down box or menu presenting a plurality of possible missions for the work vehicle 100. As illustrated in FIG. 2, the operator has previously selected the current mission for the work vehicle 100 to be a tilling operation, indicated by the word "Tilling" being presented in the current mission graphic 251. The operator selecting the current mission of the work vehicle 100 to be tilling may output an additional parameter signal to the controller 111, which may then output a recommendation signal based on the received additional parameter signal as well as the determined weight distribution of the work vehicle 100. Prior to the operator entering that tilling is the current mission, the current mission graphic 251 may present a query graphic for the operator to enter the current mission. For example, when the current mission has not yet been entered, the current mission graphic 251 may present the words "PLEASE ENTER MISSION" to indicate to an operator that the current mission should be entered.

The graphic 252 may be a total weight graphic 252 that presents a total weight of the work vehicle 100 determined by the controller 111. Similarly, the graphic 253 may be a front axle weight graphic 253 presenting an exerted weight on the front axle 105 that is determined by the controller 111 and the graphic 254 may be a rear axle weight graphic 254 presenting an exerted weight on the rear axle 103 that is determined by the controller 111. As previously described, the controller 111 may determine the front axle weight and the rear axle weight based on signals from the first weight sensor 107 and the second weight sensor 108, respectively. The total weight may then be determined as a sum of the front axle weight and the rear axle weight. As illustrated in FIG. 2, the controller 111 has determined the front axle weight to be 10,000 pounds (lbs), which is presented in the front axle weight graphic 253, and the rear axle weight to be 37,500 lbs, which is presented in the rear axle weight graphic 254. The controller 111 further determines the sum of the front axle weight and the rear axle weight, which corresponds to the total weight, to be 47,500 lbs, which is presented in the total weight graphic 252. The information displayed in the graphics 252, 253, 254 may be useful to an operator during operation.

The graphic 255 may be a recommended travel speed graphic 255 that presents a recommended operating parameter, which is a travel speed of the work vehicle 100. The recommended operating parameter may be determined by the controller 111 solely based on the determined weight distribution of the work vehicle 100. For example, the controller 111 may determine the recommended operating parameter, such as travel speed, by looking up a recommended travel speed value from a table stored in the memory 112 for the determined weight distribution. As can be determined from the front axle weight graphic 253 and the rear axle weight graphic 254, the work vehicle 100 is rear-heavy, due to the connection of the implement 140 to the work vehicle 100. Thus, the controller 111 can determine, based on this weight distribution, that the work vehicle 100 should travel at a relatively slow speed, such as 6-8 miles per hour (mph), to safely operate. The controller 111 may also determine the recommended travel speed presented in the graphic 255 based off additional parameters, such as the current mission, tire size, tire pressure, etc. It should thus be appreciated that the controller 111 may output different types of recommendation signals to update the GUI 200 in accordance with the present disclosure.

The graphic 256 may be a weight recommendation graphic 256 that presents another recommended operating parameter, which is a weight recommendation for the work vehicle 100. The weight recommendation is determined by the controller 111 based at least partially on the determined weight distribution of the work vehicle 100. In some embodiments, the controller 111 determines the weight recommendation for the work vehicle 100 based on the weight exerted on the axles 103, 105 as well as the current mission and tire sizes of the wheels 104, 106. As illustrated in FIG. 2, the tire sizes of the wheels 104, 106 are unknown so the controller 111 cannot determine the weight recommendation to present in the weight recommendation graphic 256. However, it should be appreciated that, in some embodiments, the controller 111 is configured to determine the weight recommendation based solely on the weight distribution of the work vehicle 100.

Figure 3:
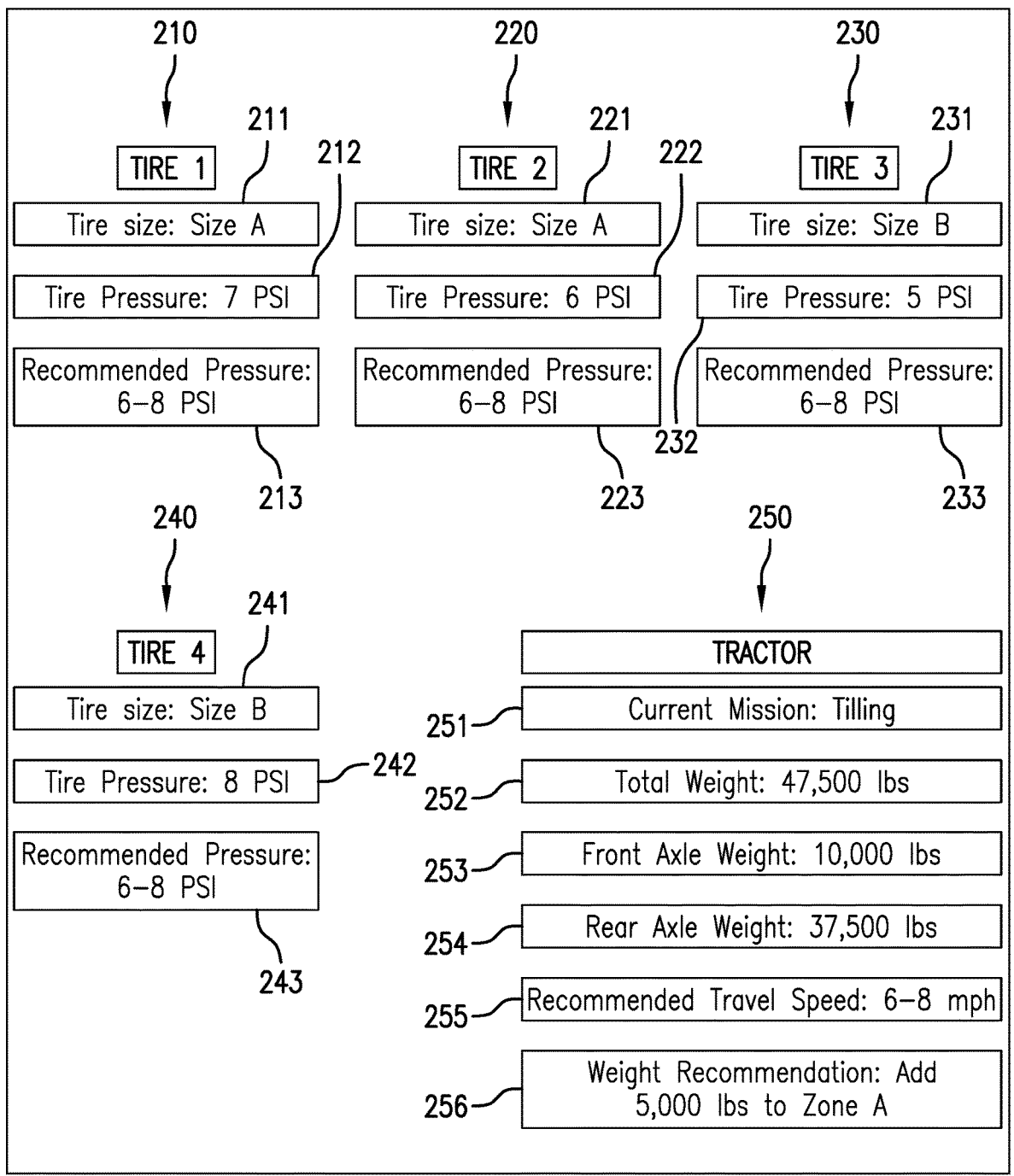
FIG. 3 is an illustration of an exemplary embodiment of an updated graphical user interface that may be presented by the display of the work vehicle illustrated in FIG. 1.

Referring now to FIG. 3, an updated GUI 300 is illustrated. The updated GUI 300 may be presented on the display 113 after an operator has input the tire sizes of the wheels 104, 106, causing the controller 111 to receive additional parameter signals and output a recommendation signal to the display 113 based on the weight distribution and the received additional parameter signals. As can be gleaned from FIG. 3, the additional parameter signals convey the tire sizes of the wheels 104, 106 to the controller 111. The controller 111 may then use the tire sizes of the wheels 104, 106, as well as the weight distribution and current mission of the work vehicle 100, to determine the recommended tire pressures and weight recommendation for the work vehicle 100. The controller 111 may determine the recommended tire pressures and weight recommendation based on a table stored in the memory 112. The controller 111 may, for example, lookup the weight distribution, tire sizes, and current mission in a matrix stored in the memory 112 that has pre-loaded recommended operating parameters for the specific combination of weight distribution, tire sizes, and current mission. The pre-loaded recommended operating parameters may be provided in the memory 112, for example, by the original manufacturer of the work vehicle 100. The updated GUI 300 can then present recommended tire pressures in the recommended tire pressure graphics 213, 223, 233, 243 and a weight recommendation in the weight recommendation graphic 256, as illustrated in FIG. 3. The weight recommendation may include both a weight amount, corresponding to an amount of weight to be added or subtracted from the work vehicle 100, and a weight placement location, corresponding to a location on the work vehicle 100 where the weight should be added (or removed). Thus, the updated GUI 300 presents additional recommended operating parameters, compared to the GUI 200 illustrated in FIG. 2, to the operator. The operator may then adjust the pressure in the tires and change the weight distribution of the work vehicle 100 by, for example, mounting ballast weights to the work vehicle 100 to operate the work vehicle 100 according to recommended parameters provided by the original manufacturer.

Figure 4:
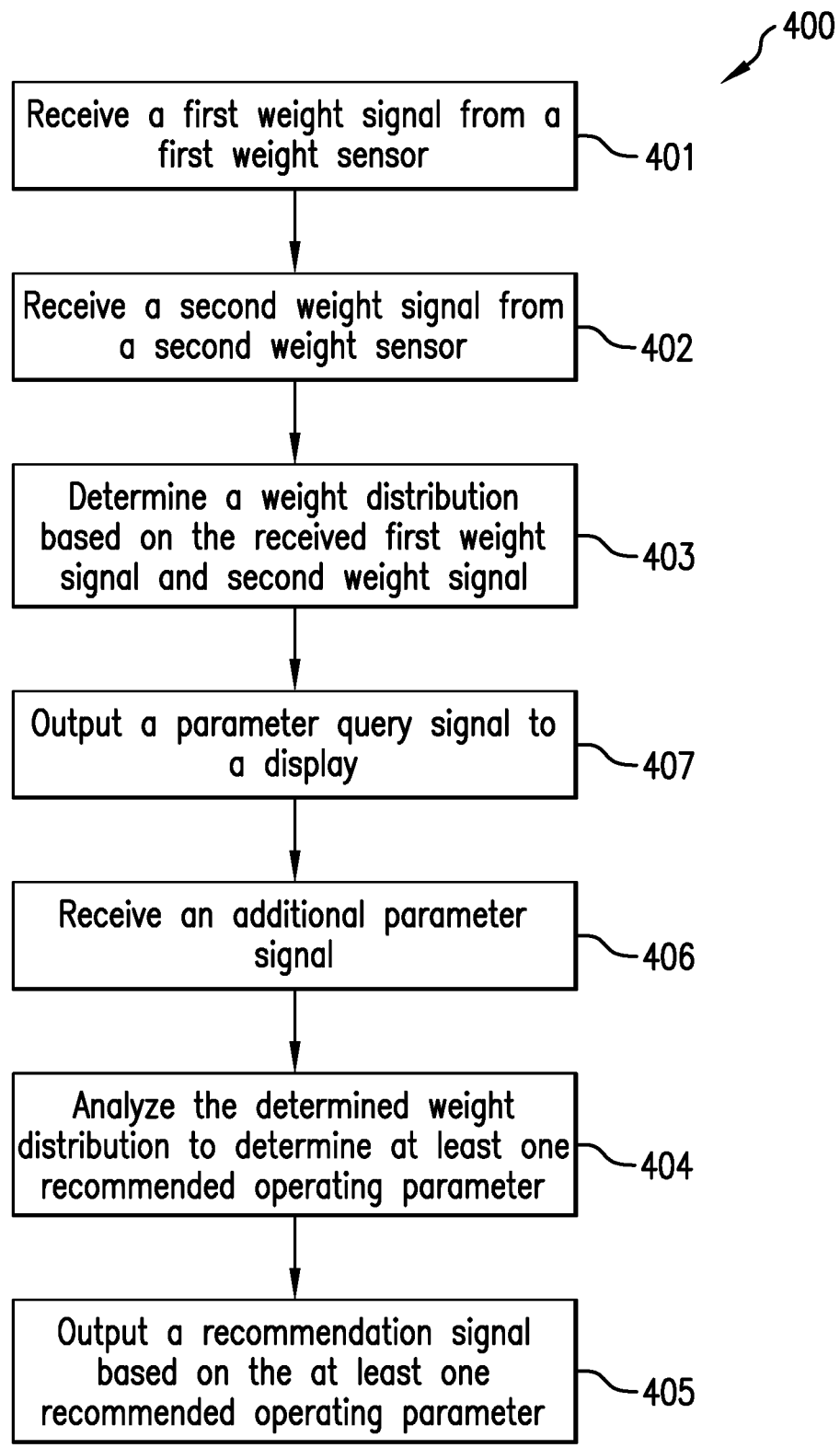
FIG. 4 is a flowchart illustrating an exemplary embodiment of a method for providing operating parameters for a work vehicle in accordance with the present disclosure.

Referring now to FIG. 4, an exemplary embodiment of a method 400 for providing operating parameters for a work vehicle, such as the tractor 100, is illustrated. The method 400 is performed by a controller, such as the previously described controller 111. The method 400 includes receiving 401 a first weight signal from a first weight sensor 107 associated with a first axle 103 rotatably coupled with a first pair of wheels 104 of the work vehicle 100 and receiving 402 a second weight signal from a second weight sensor 108 associated with a second axle 105 rotatably coupled with a second pair of wheels 106 of the work vehicle 100. The controller 111 determines 403 a weight distribution of the work vehicle 100 based on the received first weight signal and second weight signal. The controller 111 analyzes 404 the determined weight distribution to determine at least one recommended operating parameter, such as a recommended travel speed, weight placement, and/or tire pressure of the wheels 104, 106. A recommendation signal is output 405 based on the at least one recommended operating parameter. In some embodiments, the recommendation signal is output to a display 113 that is configured to receive the recommendation signal and update a displayed graphical user interface (GUI) 200, 300 based on the received recommendation signal. The controller 111 may receive 406 an additional parameter signal, such as a signal corresponding to a current mission or tire size of the work vehicle 100, and the output recommendation signal is further based on the received additional parameter signal. The additional parameter signal may include an input tire size signal, an input tire pressure signal, and/or an input mission signal. The output recommendation signal may cause the display 113 to present a recommended tire pressure for at least one of the wheels 104, 106 and/or a recommended speed of travel for the work vehicle 100. In some embodiments, the controller 111 outputs 407 a parameter query signal to the display 113 so the display 113 updates the displayed GUI 200, 300 to present at least one additional parameter input graphic, such as the previously described tire size graphics 211, 221, 231, 241. The updated GUI 300 may also present a recommended weight amount and/or a recommended weight placement in, for example, a weight recommendation graphic 256. The updated GUI 300 may also present a recommended tire pressure for one or more of the wheels 104, 106 in recommended pressure graphics 213, 223, 233, 243.

From the foregoing, it should be appreciated that exemplary embodiments provided in accordance with the present disclosure can provide intuitive and easy-to-use work vehicles 100 and methods 400 that an operator may use to determine recommended operating parameters for the work vehicle 100. For example, the control system 110 may direct an operator to enter various items of information into a display 113 via graphics presented on the display 113. The input information may then be received by a controller 111, which can determine one or more recommended operating parameters based on the input information, such as a weight distribution of the work vehicle 100 and a current mission of the work vehicle 100. Once the recommended operating parameter(s) are determined, the controller 111 can output a recommendation signal to the display 113 to convey the recommended operating parameter(s) to the operator. The operator may then make the necessary physical adjustments to the work vehicle 100, such as adding ballast weights to the work vehicle 100, to complete the desired mission according to recommended operating parameters.

The work vehicle 100 and method 400 provided in accordance with the present disclosure can reduce the risk of an operator operating the work machine in an inefficient or dangerous manner. For example, the display 113 can present recommended operating parameters, such as tire pressures and weight distribution for the work vehicle 100, based on the output recommendation signal(s) that reduce the risk of the work vehicle 100 not being able to keep proper traction or handle properly during operation. Further, the output recommendation signal(s) can cause the display 113 to present recommended operating parameters that reduce the risk of excessive soil compaction, fuel consumption, and drivetrain wear. Thus, the work vehicle 100 and method 400 provided in accordance with the present disclosure can provide an operator with an intuitive system that requires little input from the operator to convey recommended operating parameters to the operator.

It is to be understood that, in some embodiments, the steps of the method 400 are performed by the controller 111 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 111 described herein, such as the method 400, is implemented in software code or instructions which are tangibly stored on a tangible computer readable medium. The controller 111 loads the software code or instructions via a direct interface with the computer readable medium or via a wired and/or wireless network. Upon loading and executing such software code or instructions by the controller 111, the controller 111 may perform any of the functionality of the controller 111 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle, comprising:
   a chassis;
   a first axle carried by the chassis;
   a pair of first wheels rotatably coupled to the first axle;
   a first weight sensor associated with the first axle and configured to output a first weight signal;
   a second axle carried by the chassis;
   a pair of second wheels rotatably coupled to the second axle;
   a second weight sensor associated with the second axle and configured to output a second weight signal;
   a controller operatively coupled to the first weight sensor and the second weight sensor, the controller being configured to:
      receive the first weight signal and the second weight signal;
      determine a weight distribution of the work vehicle based on the received first weight signal and the received second weight signal;
      analyze the determined weight distribution to determine at least one recommended operating parameter; and
      output a recommendation signal based on the at least one recommended operating parameter; and
   a display operatively coupled to the controller and configured to receive the recommendation signal and update a displayed graphical user interface based on the received recommendation signal, wherein the received recommendation signal causes the display to present a recommended speed of travel for the work vehicle.

2. The work vehicle of claim 1, wherein the controller is further configured to receive an additional parameter signal.

3. The work vehicle of claim 2, wherein the controller is configured to output the recommendation signal further based on the received additional parameter signal.

4. The work vehicle of claim 3, wherein the additional parameter signal comprises at least one of an input tire size signal, an input tire pressure signal or an input mission signal.

5. The work vehicle of claim 3, wherein the received recommendation signal causes the display to also present a recommended tire pressure for at least one of the wheels.

6. The work vehicle of claim 2, wherein the controller is further configured to output a parameter query signal to the display and the display is further configured to update the displayed graphical user interface to display at least one additional parameter input graphic.

7. The work vehicle of claim 1, wherein the updated displayed graphical user interface presents at least one of a recommended weight amount and a recommended weight placement.

8. The work vehicle of claim 7, wherein the updated displayed graphical user interface further presents a recommended tire pressure for at least one of the wheels.

9. A method for providing operating parameters for a work vehicle, the method being performed by a controller and comprising:
   receiving a first weight signal from a first weight sensor associated with a first axle rotatably coupled with a first pair of wheels of the work vehicle;
   receiving a second weight signal from a second weight sensor associated with a second axle rotatably coupled with a second pair of wheels of the work vehicle;
   determining a weight distribution of the work vehicle based on the received first weight signal and the received second weight signal;
   analyzing the determined weight distribution to determine at least one recommended operating parameter; and
   outputting a recommendation signal based on the at least one recommended operating parameter, wherein the work vehicle comprises a display operatively coupled to the controller and configured to receive the recommendation signal and update a displayed graphical user interface based on the received recommendation signal, wherein the received recommendation signal causes the display to present a recommended speed of travel for the work vehicle.

10. The method of claim 9, further comprising receiving an additional parameter signal.

11. The method of claim 10, wherein the output recommendation signal is further based on the received additional parameter signal.

12. The method claim 11, wherein the additional parameter signal comprises at least one of an input tire size, an input tire pressure signal, and an input mission signal.

13. The method of claim 11, wherein the received recommendation signal causes the display to also present a recommended tire pressure for at least one of the wheels.

14. The method of claim 10, further comprising outputting a parameter query signal to the display so the display updates the displayed graphical user interface to present at least one additional parameter input graphic.

15. The method of claim 9, wherein the updated displayed graphical user interface presents at least one of a recommended weight amount and a recommended weight placement.

16. The method of claim 15, wherein the updated displayed graphical user interface further presents a recommended tire pressure for at least one of the wheels.

\* \* \* \* \*